United States Patent [19]

Färber

[11] Patent Number: 4,698,916
[45] Date of Patent: Oct. 13, 1987

[54] DEVICE FOR ROASTING COFFEE BEANS, ESPECIALLY GREEN COFFEE BEANS IN SMALL QUANTITIES

[75] Inventor: Karlheinz Färber, Giengen, Fed. Rep. of Germany

[73] Assignee: Bosch-Siemens Hausgeraete GmbH, Stuttgart, Fed. Rep. of Germany

[21] Appl. No.: 867,797

[22] Filed: May 23, 1986

Related U.S. Application Data

[63] Continuation-in-part of Ser. No. 491,566, May 4, 1983, abandoned.

[30] Foreign Application Priority Data

May 6, 1982 [DE] Fed. Rep. of Germany ....... 3217055

[51] Int. Cl.⁴ .............................................. F26B 17/10
[52] U.S. Cl. .................................. 34/57 A; 34/57 E; 34/233
[58] Field of Search ................. 34/10, 57 A, 57 E, 54, 34/233, 53, 48, 46, 54, 44, 57 D

[56] References Cited

U.S. PATENT DOCUMENTS

| | | | |
|---|---|---|---|
| 2,105,778 | 1/1938 | Behr et al. | 34/57 A |
| 3,673,699 | 7/1972 | Buffington | 34/66 |
| 3,964,175 | 6/1976 | Sivetz | 34/57 A |
| 4,325,191 | 4/1982 | Kumagai et al. | 34/54 |
| 4,494,314 | 1/1985 | Gell, Jr. | 34/57 E |

Primary Examiner—Larry I. Schwartz
Attorney, Agent, or Firm—Herbert L. Lerner; Laurence A. Greenberg

[57] ABSTRACT

A method for roasting coffee beans in a roasting chamber, which includes depositing a quantity of coffee beans in the roasting chamber being small in proportion to the volume of the roasting chamber, directing a heatable air current through the roasting chamber substantially vertically from the bottom upward for rotating, upwardly whirling and circulating the coffee beans in a freely suspended state substantially untouched by each other and by the roasting chamber, and a device for carrying out the method.

22 Claims, 13 Drawing Figures

DEVICE FOR ROASTING COFFEE BEANS, ESPECIALLY GREEN COFFEE BEANS IN SMALL QUANTITIES

This is a continuation-in-part of application Ser. No. 491,566, filed May 4, 1983, now abandoned.

The invention relates to a method and a device for roasting coffee beans, especially green coffee beans in small quantities, using a roasting chamber through which a heatable air current flows from the bottom upward, essentially in a vertical direction, for tumbling or rotating the coffee beans.

The application of such a method and such a device is of special interest for the user of coffee beans. It satisfies the need to perform the roasting of the coffee beans a short time before or preferably immediately before the use of the coffee beans, i.e. before the grinding operation. The desire to roast coffee beans in this time frame results in an improved aroma, for example, because roasted coffee beans have a considerably greater loss of aroma when stored, as compared to green coffee beans. Beyond this, by assigning the task of performing the roasting process to the coffee bean consumer, the user is able to influence the roasting process to his own individual wishes, and to obtain a corresponding roasting result.

In the case of commercial roasting of coffee beans, a great number of methods and devices have been known, which on one hand have the objective of obtaining the desired roasting results as reliably as possible in a reproducible way, and which on the other hand can fulfill the requirement of processing large amounts of coffee beans.

For example, it is known to tumble the coffee beans to be roasted in rotating roasting drums through which heated gases are conducted. Roasting times can be varied in this way, so that different roasting results can be achieved.

During the roasting process, a difficulty is frequently encountered which is that because of uneven exposure to the roasting heat, a certain amount of the coffee beans are already charred and burned, while other coffee beans are not yet roasted to the required degree. These differences occur quite frequently, and are caused by the fact that during the conventional roasting methods, the coffee beans touch each other, and come in contact with the wall of the roasting chamber to a great extent. This causes heat concentrations on one hand, and an insufficient heat supply to some individual coffee beans on the other hand.

Based on these experiences, roasting methods have been developed for the commercial market, which intermix an amount of coffee beans in a roasting chamber for an improvement in the roasting results. For example, it has been disclosed in U.S. Pat. No. 2,859,116 to perform the roasting of a quantity of coffee beans in a hot air current which flows from the bottom upward, the coffee beans being suspended or floated in a stationary conically-shaped roasting chamber. Furthermore, a method and a device for roasting coffee beans has been disclosed in German Published, Non-Prosecuted Application DE-OS No. 25 31 390, wherein the coffee beans occupy a great part of the interior of the roasting chamber and a heated air current is conducted into the roasting chamber from below. The air current flows through the coffee beans, and thereby keeps them in a suspended state in the form of a dense, constantly circulating, fluidized mass.

These conventional devices and measures for roasting coffee beans are hardly suited for use outside the commercial field, such as in private households, for example. This is mainly for the reason that these methods are intended for roasting large quantities, and in order to obtain satisfactory roasting results require a highly qualified and trained roasting expert.

It is accordingly an object of the invention to provide a method and device for roasting coffee beans, especially green coffee beans in small quantities, which overcomes the hereinafore-mentioned disadvantages of the heretofore-known methods and devices of this general type, in which coffee beans are to be roasted in small quantities and undergo a uniformly acting roasting process. The requirements for the person using the device are such that the roasting process can also be performed without any special skills with great reliability and good results, such as in a private household.

With the foregoing and other objects in view there is provided, in accordance with the invention, a method for roasting coffee beans in a roasting chamber, especially green coffee beans in small quantities, which comprises depositing a quantity of coffee beans in the roasting chamber being small in proportion to or smaller than the volume of the roasting chamber, directing a heatable air current through the roasting chamber substantially vertically from the bottom upward for rotating, upwardly whirling and circulating the coffee beans in a freely suspended state substantially untouched by each other and by the roasting chamber housing.

Such a method for roasting green coffee beans is especially characterized by the fact that all coffee beans are virtually in a suspended state due to the air current flowing up from the bottom, whereby the air current envelops all of the coffee beans individually, exposes them uniformly to the heat of the air current, and thus also submits the beans to a uniform roasting process. As long as the maximum quantity of coffee beans in the roasting chamber is not exceeded in such a way that free tumbling of the coffee beans can no longer take place, the result of the roasting process is also quite independent of the amount of coffee beans to be roasted. This is also important for roasting coffee beans by the consumer in direct connection with the further use of the roasted coffee beans.

For generating the air current in the most practical way, an electrically driven blower is used, which supplies the air current from the bottom upward through a heating region of the roasting chamber. The air current is discharged in the upper region of the roasting chamber.

In accordance with another mode of the invention, there is provided a method which comprises causing the coffee beans to whirl upward in vicinity of the center of the vertically directed air current against the force of gravity, causing the coffee beans to descend in vicinity of the edge of the air current, and leading the coffee beans back into the center of the air current with control surfaces. This action maintains the circulation of the floating or suspended coffee beans.

In order to carry out the method, there is provided a device for roasting coffee beans, comprising a roasting chamber having a given volume for receiving a quantity of coffee beans being small in proportion to the volume of the roasting chamber, and means for directing a heatable air current through the roasting chamber substantially vertically from the bottom upward for rotating, upwardly whirling and circulating the coffee beans in a freely suspended state substantially untouched by each other and by the roasting chamber, the roasting chamber having a funnel-shaped air current inlet region with an air inlet formed therein. The funnel-shape may be symmetrical, although it may also have an asymmetrical form.

The air current which is let in from the bottom into the roasting chamber is adjusted for this purpose in such a way that the coffee beans in the roasting chamber are kept in a suspended state. Therefore, there is no reason to provide means for preventing the coffee beans from falling through the air inlet opening which is formed at the bottom of the roasting chamber.

However, for a number of applications it is advantageous if, in accordance with another feature of the invention, there is provided a grating closing the air inlet, the grating having mesh openings formed therein being smaller than the diameter of the coffee beans. In this case, the coffee beans drop through this grating when the air supply is interrupted.

In accordance with a further feature of the invention, there is provided a roasting waste settling chamber disposed in vicinity of an air current outlet opening formed in the roasting chamber. Such a settling chamber for the deposit of roasting wastes is constructed incorporating known principles of flow technology.

In accordance with an added feature of the invention, the roasting waste settling chamber is disposed at a side of the roasting chamber.

In accordance with an additional feature of the invention, the roasting waste settling chamber is an integral part of an upper region of the roasting chamber. It is advantageous to make the roasting waste settling chamber detachable for the purpose of emptying it or for cleaning it.

To make the roasting process for coffee beans as simple as possible, it is practical to suck in the air current to be heated from the free atmosphere, and to discharge it again into the free atmosphere after it leaves the roasting chamber or leaves the roasting waste settling chamber, respectively. Due to the short roasting time, the energy loss in this case is negligible. This method ensures the fact that the same conditions regarding the air current exist during all phases of the roasting process.

Especially during the transition to the cooling phase, the method and device fulfill the requirement of having the cooling air impinge the coffee beans immediately after the roasting phase. The heating elements over which the air current flows in the heating region, can and should be constructed according to the latest improvements in this field, in such a way that their own specific heat capacity is as low as possible.

In accordance with again another feature of the invention, there is provided a housing having an air heating region and means for conducting air leaving the roasting chamber through the heating region to an air inlet formed in the roasting chamber. Through the use of this construction, if desired, it is possible to achieve a savings of energy as well as to avoid pollution of the environment due to the roasting process.

In accordance with again a further feature of the invention, there is provided a housing having an air heating region, the air heating region and roasting chamber being disposed on top of each other in the form of a column. This structure does not require air channels between the roasting chamber and the heating region. Firstly, such air channels cool the air current and secondly they have disadvantageous heat capacities. Preferably this construction can be further rounded out if, in accordance with again an added feature of the invention, there is provided a blower disposed in the housing for generating the air current, the blower, air heating region and roasting chamber being disposed on top of each other in the form of a column. This construction is completed by a housing which is also columnar.

In accordance with again an additional feature of the invention, there is provided a housing, an air heating region disposed in the housing, and a blower disposed in the housing for generating the air current, the air heating region and blower being disposed laterally relative to the air inlet formed in the roasting chamber.

In accordance with yet another feature of the invention, the air heating region and the blower are mutually horizontally aligned. This embodiment is especially practical in connection with a further measure. In accordance with yet a further feature of the invention, there is provided a channel for the air current disposed below the air inlet formed in the roasting chamber, a cover disposed in the channel, and means for opening the cover. If the roasting chamber has no grating in the air inlet region, or if there is a grating which can be swung away, and if after the roasting process the trapdoor below the roasting chamber is opened and the air current in the roasting chamber is turned off, it then becomes possible for the freshly roasted coffee beans to drop directly downward from the roasting chamber, and be collected there. In accordance with yet an added feature of the invention, there is provided a cooling region for the coffee beans disposed in the housing below the cover. In accordance with yet an additional feature of the invention, there is provided a grating through which cooling air is sucked, the grating having a surface for supporting coffee beans forming the cooling region.

In accordance with still another feature of the invention, the blower has a pressure side delivering the air current to the heating region and a suction side receiving the air current in the form of the cooling air sucked through the grating. This means that the same blower can be used for supplying the heated air current into the roasting chamber as well as for generating the cooling flow in the cooling region for the coffee beans.

In accordance with still a further feature of the invention, there is provided a housing on which the roasting chamber is detachably mounted, an air heating region disposed in the housing, and a blower disposed in the housing. This makes it simple to remove the roasted beans from the roasting chamber and to clean the roasting chamber. In accordance with still an added feature of the invention, there is provided a heating device disposed in the heating region and a safety switch disposed in the housing and electrically connected to the blower and heating device for supplying voltage to the blower and heating device in dependence on the presence of the roasting chamber on the housing. This makes certain that the device does not operate with the roasting chamber removed from the housing, since the safety switch is closed by placing the roasting chamber in position.

In accordance with still an additional feature of the invention, the roasting chamber has a wall being at least partially transparent. This is done in order to observe the roasting process and to shorten or lengthen the roasting process individually by visual observation. In accordance with another feature of the invention, there are provided means for illuminating the roasting chamber.

In accordance with a further feature of the invention, there is provided a housing disposed below the roasting chamber, a heating region disposed in the housing, a heating element disposed in the heating region, a blower disposed in the housing and a power control timer switch and/or temparature control switch disposed in the housing and electrically connected to the heating element and the blower for time and/or temperature cycle control of the heating element and blower. The time control as well as the temparature control may be used individually or in combination with each other.

With aid of a device which is provided with a power control timer circuit and/or a temperature control circuit, the roasting process for the coffee beans can be controlled in a special manner. In accordance with an added mode of the invention, there is provided a method which includes a housing disposed below the roasting chamber, a heating region disposed in the housing, a heating element disposed in the heating region, a blower disposed in the housing, and a power control timer switch disposed in the housing and electrically connected to the heating element and the blower, which comprises activating the heating element and the blower simultaneously with the timer switch in a first time interval, and only activating the blower with the timer switch in a second subsequent cooling phase time interval. In this way, the cooling phase follows immediately after the actual roasting phase. For example, a time switch in form of a mechanical timer with control cams for the heating element and the blower, permits the setting of different roasting times, while the cooling phase always has the same duration, independent of the roasting phase. The cost of such a time control is very small. In a accordance with an additional mode of the invention, there is provided a method which comprises interrupting the operation of the blower for a relatively short time before starting the cooling phase time interval. In accordance with again another mode of the invention, there is provided a method including a temperature control switch disposed in the housing and electrically connected to the heating element and the blower, which comprises individually presetting time and temperature values with the switches for a roasting process.

The blower for generating the air current which is conducted into the roasting chamber after passing over the heating region in principle can be a radial, axial or tangential blower. In accordance with a concomitant feature of the invention, the blower is a stage or stepped blower having two steps for generating the air current for the roasting chamber. To increase the pressure of the air current, the two-step or two-stage blower is used. A radial or axial fan or a combination are disposed at both sides of the driving electric motor.

Although the invention is illustrated and described herein as embodied in a method and device for roasting coffee beans, especially green coffee beans in small quantities, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

Figure 1:
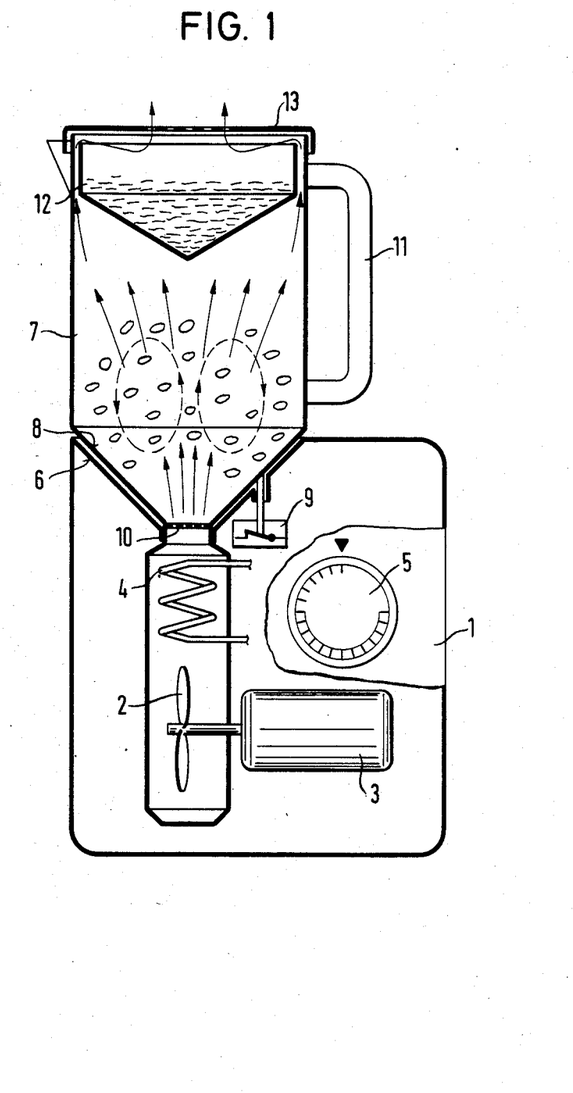
FIG. 1 is a diagrammatic front elevational view, partly broken away, of a roasting device according to an embodiment of the invention.

Referring now to the figures of the drawing in detail and first particularly to FIG. 1 thereof, it is seen that a housing 1 encloses an air blower formed of a fan wheel 2 and an electric motor 3, an air-heating device 4 in a heating region, and a control unit which can be operated by a control switch 5, the control unit itself not being shown in detail. A roasting chamber 7 is positioned with a funnel-shaped lower portion 8 thereof in another funnel-shaped recess 6 of the housing 1. A safety or protection switch 9 inside the housing 1 is influenced by the roasting chamber 7 in such a manner that the roasting process can be carried out if the roasting chamber 7 is properly positioned on top of the housing 1, and the operation of the blower and heating device is prevented when the roasting chamber is taken off. The air inlet opening into the roasting chamber 7 is covered by a grating or screen 10, which has the purpose of preventing coffee beans in the roasting chamber 7 from falling downward into the air heating region and into the blower when the blower is turned off. To facilitate its use, the roasting chamber 7 is provided with a handle grip 11. A roasting waste trap 12 is integrated into the upper region of the roasting chamber 7. Air flow which passes through the roasting chamber is conducted through the trap, in order to separate roasting wastes before the air flow is discharged to the outside through openings in a lid 13 of the roasting chamber. It is advantageous to provide filters for these openings.

The roasting operation is started by setting the timer switch corresponding to a value which is known from experience. Therefore, in time sequence, the blower is turned on first, and then the heating device 4 is activated. Thereafter, the control or timer switch operates as a short interval time clock, so that at this stage in the recurrent function in a first time phase, the blower as well as the heating device 4 in the heating zone are in operation. The coffee beans in the roasting chamber therefore go through the actual roasting process. The coffee beans are thus blown upward by the turbulence in the center of the air current, so that they float essentially freely in the roasting chamber. In the outer region of the roasting chamber where the air current is less intensive, the coffee beans sink downward with a reduced falling velocity. However, in the funnel-shaped reion 8 of the roasting chamber 7, these coffee beans again travel into the central flow region of the air current, and are whirled upward. A uniform roasting of the coffee beans is therefore ensured. The transparent wall of the roasting chamber 7 permits a visual control of the state of the coffee beans during the whole roasting operation. Empirical values regarding the length of the actual roasting process may be set by the timer or control switch 5. However, the roasting process may also be lengthened or shortened during the roasting cycle. After the roasting process is ended, the heat energy supply in the air heating zone is turned off by the timer switch 5, while the blower continues running. Thus, only cool air is now blown into the roasting chamber, which now performs the required cooling phase for the heated coffee beans. After the timer is completely run down, the blower is also turned off.

Figure 2:
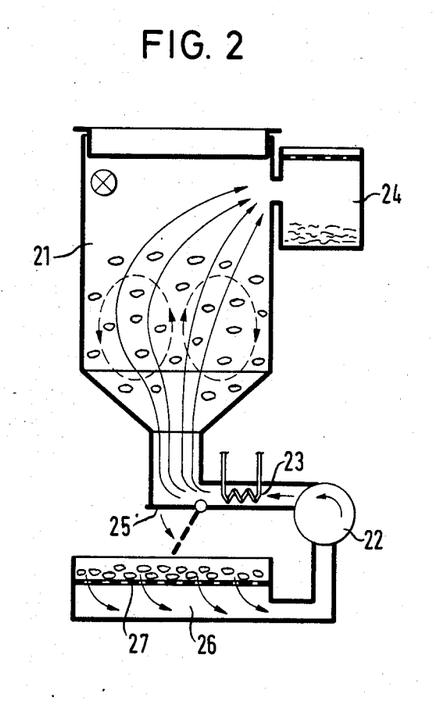
FIG. 2 is a view similar to FIG. 1 of another embodiment of a roasting device according to the invention.

FIG. 2 diagrammatically illustrates a roasting chamber 21 in which the coffee beans are kept in circulating suspension by the air current generated by a blower 22. Through the use of a heating device 23 in a heating region, this air current is heated to the temperature required for roasting the coffee beans. In the upper region of the roasting chamber 21, the air current is conducted to the outside through a roasting waste trap or settling chamber 24. The path of the air current is indicated by solid line arrows, while the desired motion of the coffee beans is symbolized by broken line arrows.

As shown in FIG. 2, the blower 22 and the heating zone containing the heating device 23 are shifted laterally from the vertical with respect to the air inlet opening in the roasting chamber 21. This makes it possible to place a controllable hinged cover mechanism 25 in the air flow channel below the entrance opening in the roasting chamber 21. Subsequent to roasting the coffee beans in the roasting chamber 21, this cover mechanism 25 is activated, so that after the blower has turned off, the roasted coffee beans can fall freely downward from the roasting chamber 21 into a cooling region 26. The cooling region includes a grating 27 onto which the roasted coffee beans are deposited. The blower 22 which is automatically turned on again, sucks cool air through the coffee beans and the grating 27, so that the required cooling process for the coffee beans is carried out. Since no heat energy is required during this functional phase, there is no heat energy generated.

In the case of the roasting device according to FIGS. 3 to 5, a heating device 32 is located in a heating region in the housing 31 directly below a roasting chamber 33 which is disposed in the housing, while a blower 34 and a time control unit 35 are disposed laterally within the housing. A roasting waste trap or settling chamber 36 is disposed alongside the roasting chamber 33. An air current is sucked in through an entrance opening 37 in the housing wall 31. The air is supplied into the roasting chamber 33 in a heated state by means of the heating region 32, and in a cool state during the cooling phase in the proper sequence. The air current is discharged to the outside again through the roasting waste trap or settling chamber 36, exit openings and a filter device.

Figure 3:
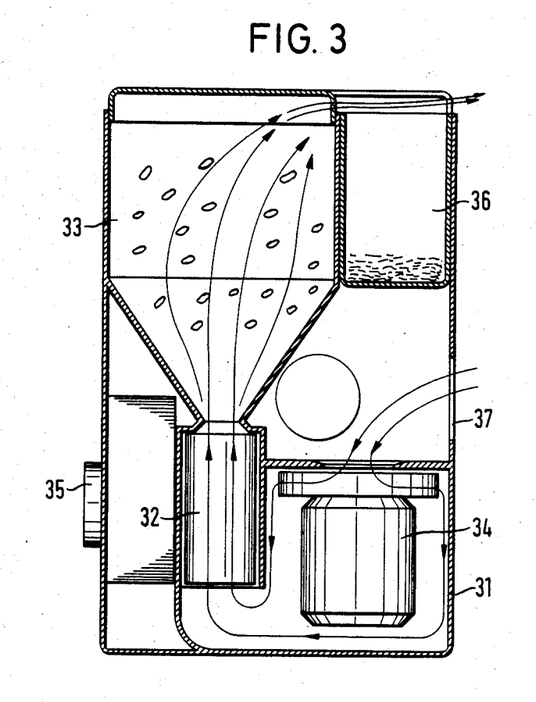
FIGS. 3 to 5 are a cross-sectional side view, a side-elevational view and a top plan view, respectively, of a further embodiment of the invention.
Figure 4:
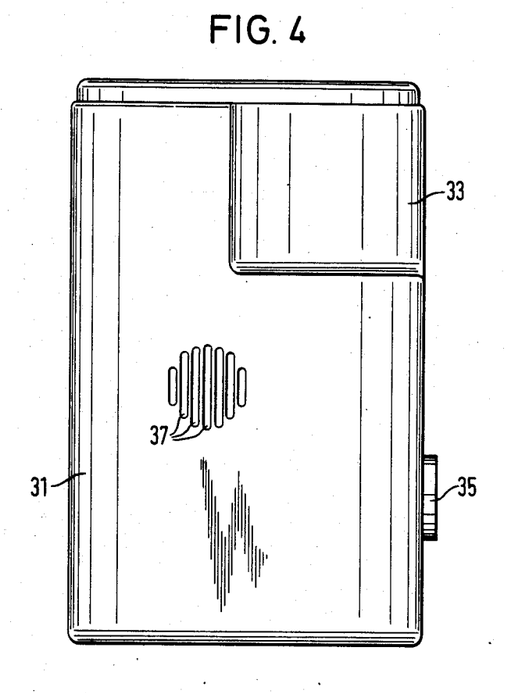
Figure 5:
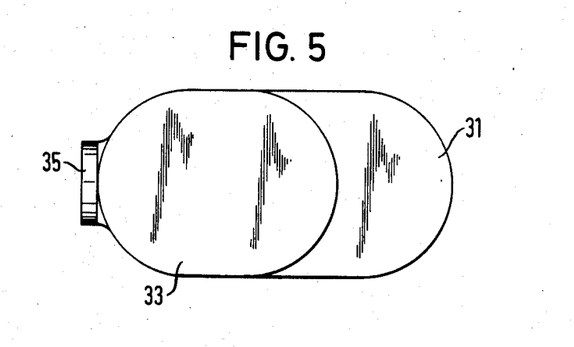
Figure 6:
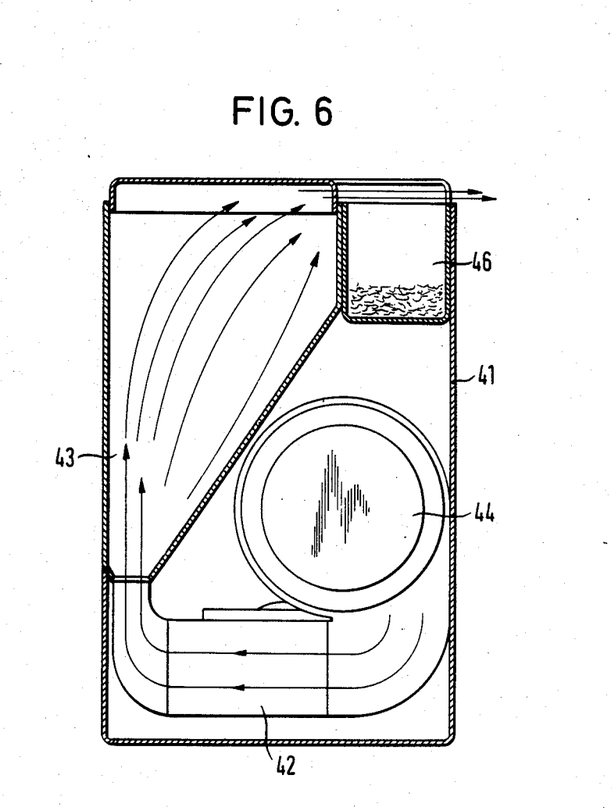
FIGS. 6 to 8 are views corresponding to FIGS. 3 to 5 of an additional embodiment of the invention.
Figure 7:
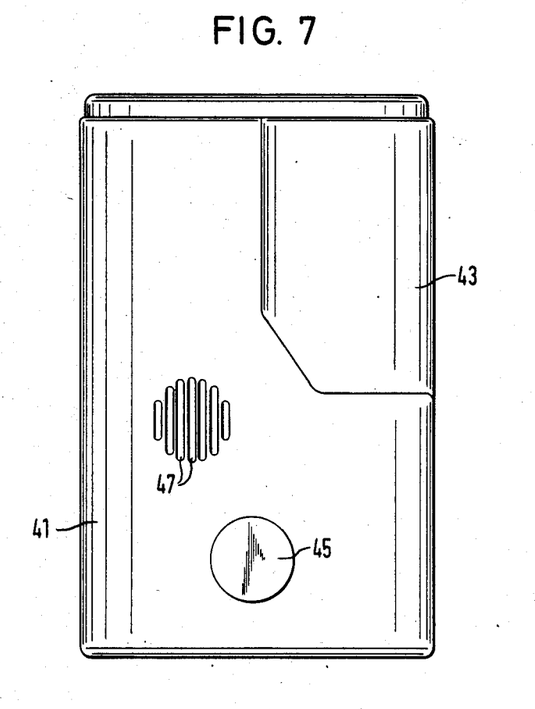
Figure 8:
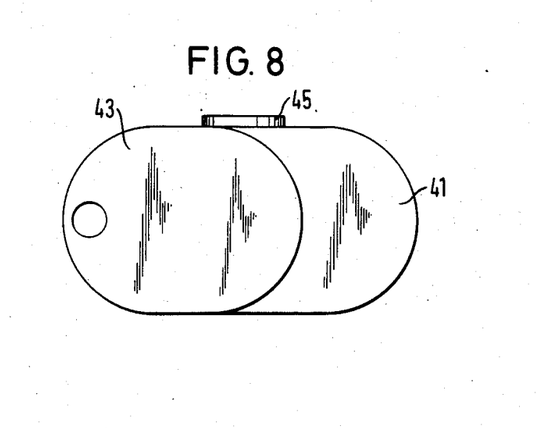

The construction of the roasting device according to FIGS. 6 to 8 is similar to that of FIGS. 3 to 5. In this case the essential difference is that a heating device 42 in a heating region is not disposed directly under a roasting chamber 43, but is displaced laterally from the vertical in a housing 41. The roasting chamber 43 has an assymetrical configuration. The blower is in this case a tangential blower 44. A timer 45 and a roasting waste trap 46 are also seen.

Figure 9:
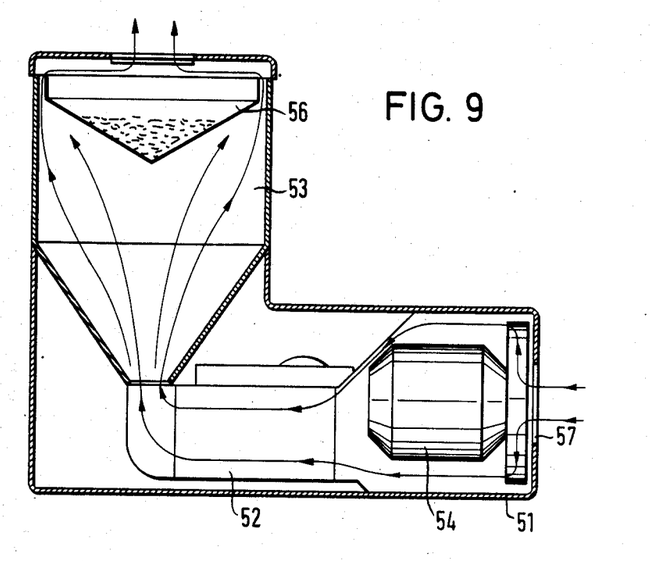
FIGS. 9 to 11 are other views corresponding to FIGS. 3 to 5 of yet another embodiment of the invention.
Figure 10:
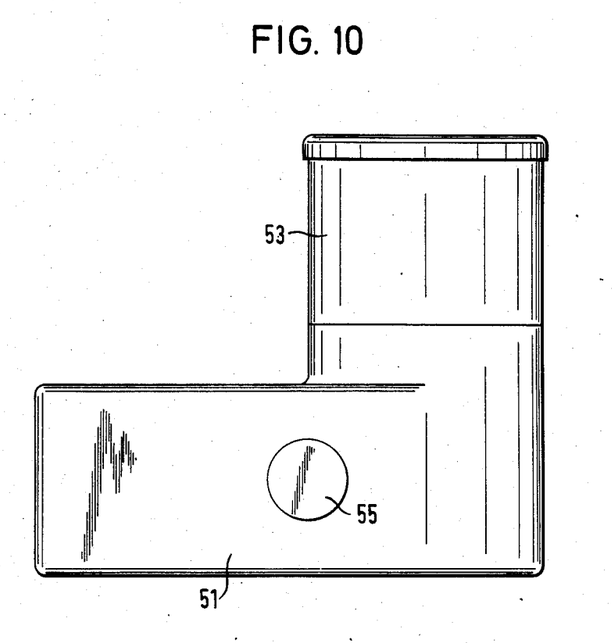
Figure 11:
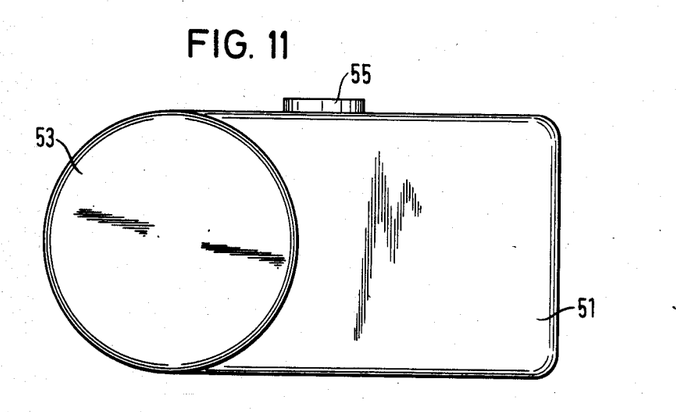

Another variation of the roasting device is shown in FIGS. 9 to 11. The illustrated disposition of a blower 54 and a heating device 52 in a heating region permit a very flat and low construction of a housing 51 of the applicance, the roasting chamber 53 being placed upon this housing. A roasting waste trap or settling chamber 56 is integrated into the upper region of the roasting chamber 53, which has a cylindrical shape. A timer 55 and an air inlet 57 are also seen at the housing 51.

Figure 12:
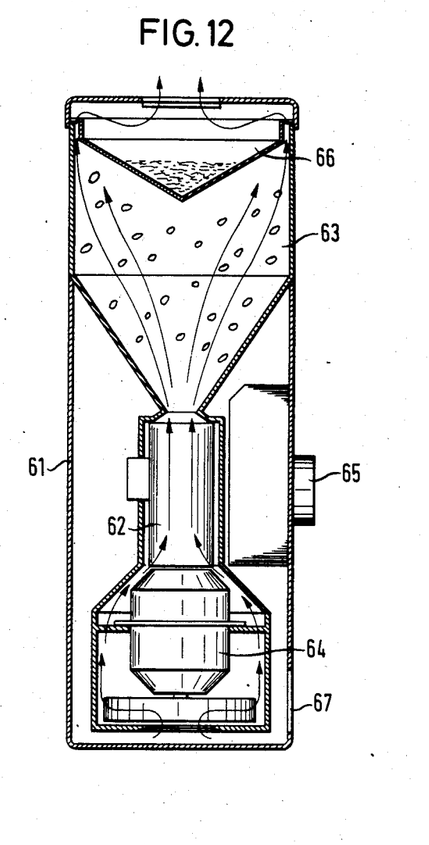
FIGS. 12 and 13 are a top plan view and a cross-sectional view of yet an additional embodiment form of a roasting device of the invention.
Figure 13:
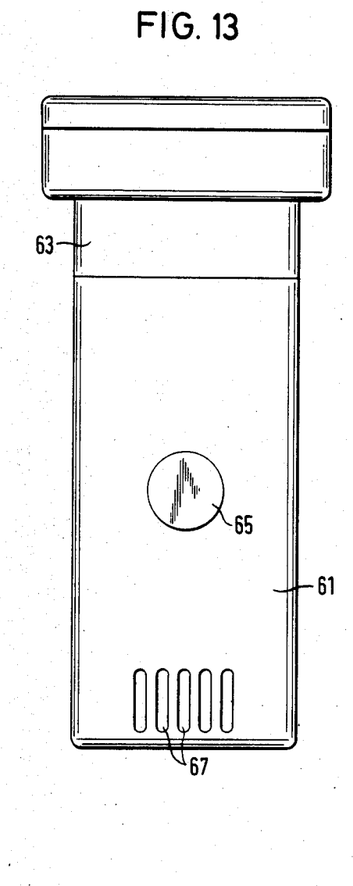

According to FIGS. 12 and 13, a columnar construction of the functional elements including a blower 64, and air heating device 62 in an air heating region, a roasting chamber 63 and a roasting waste trap or chamber 66 has been chosen for the roasting device, so that a housing 61 which is provided is consequently also columnar. The housing 61 has an air inlet 67 formed therein and a timer 65 disposed thereon.

The illustrated and described embodiments show the great number of possible constructions of the device. Furthermore, variations of the general concept of the invention can be visualized. For example, it is possible to construct the roasting device in such a way that the air discharged from the roasting waste trap or settling chamber is again conducted back into the roasting process by the blower, either directly or after an additional cleaning process. A further variation is the use of a blower with several steps or stages.

The roasting chambers 7, 21, 33, 43, 53 and 63 each have a volume which is approximately 250 ML ($CM^3$) The roasting chamber is filled with approximately 100 g of green coffee beans, which is about 30% of the capacity of the roasting chamber. However, it should be noted that the exact amount of coffee beans and the exact roasting time are varied according to individual taste, just as the amount of ground coffee and the duration of brewing in a particular coffee pot are varied according to taste.

The embodiments of the invention in which an exclusive property or privilege is claimed are defined as follows:

1. Device for roasting coffee beans, comprising a roasting chamber having a given volume for receiving a quantity of coffee beans being small in proportion to the volume of said roasting chamber, means for directing a heatable air current through said roasting chamber substantially vertically from the bottom upward for rotating, upwardly whirling and circulating the coffee beans in a freely suspended state substantially untouched by each other and by said roasting chamber, said roasting chamber having an upper region and sides, said roasting chamber having a funnel-shaped air current inlet region with an air inlet formed therein, and said roasting chamber having an air current outlet opening formed therein, and a roasting waste settling chamber forming an integral part of said upper region, said roasting waste settling chamber being disposed at one of said sides of said roasting chamber in the vicinity of said air current outlet opening.

2. Device according to claim 1, including a grating closing said air inlet, said grating having mesh openings formed therein being smaller than the diameter of the coffee beans.

3. Device according to claim 1, wherein air leaves said roasting chamber through said air current outlet opening, and including a housing having an air heating region and means for conducting air leaving said roasting chamber through said heating region to an air inlet formed in said roasting chamber.

4. Device according to claim 1, including a housing having an air heating region, said air heating region and roasting chamber being disposed on top of each other in the form of a column.

5. Device according to claim 4, including a blower disposed in said housing for generating the air current, said blower, air heating region and roasting chamber being disposed on top of each other in the form of a column.

6. Device according to claim 1, including a housing, an air heating region disposed in said housing, and a blower disposed in said housing for generating the air current, said air heating region and blower being disposed laterally relative to said air inlet formed in said roasting chamber.

7. Device according to claim 6, wherein said air heating region and said blower are mutually horizontally aligned.

8. Device according to claim 6, including a channel for the air current disposed below said air inlet formed in said roasting chamber, a cover disposed in said channel, and means for opening said cover.

9. Device according to claim 7, including a channel for the air current disposed below said air inlet formed in said roasting chamber, a cover disposed in said channel, and means for opening said cover.

10. Device according to claim 8, including a cooling region for the coffee beans disposed in said housing below said cover.

11. Device according to claim 9, including a cooling region for the coffee beans disposed in said housing below said cover.

12. Device according to claim 10, including a grating through which cooling air is sucked, said grating having a surface for supporting coffee beans forming said cooling region.

13. Device according to claim 11, including a grating through which cooling air is sucked, said grating having a surface for supporting coffee beans forming said cooling region.

14. Device according to claim 12, wherein said blower has a pressure side delivering the air current to said heating region and a suction side receiving the air current in the form of the cooling air sucked through said grating.

15. Device according to claim 13, wherein said blower has a pressure side delivering the air current to said heating region and a suction side receiving the air current in the form of the cooling air sucked through said grating.

16. Device according to claim 1, wherein said roasting chamber has a wall being at least partially transparent.

17. Device according to claim 16, including means for illuminating said roasting chamber.

18. Device according to claim 1, including a housing disposed below said roasting chamber, a heating region disposed in said housing, a heating element disposed in said heating region, a blower disposed in said housing, and a power control timer switch disposed in said housing and electrically connected to said heating element and said blower for time control of said heating element and blower.

19. Device according to claim 1, including a housing disposed below said roasting chamber, a heating region disposed in said housing, a heating element disposed in said heating region, a blower disposed in said housing, and a temperature control switch disposed in said housing and electrically connected to said heating element and said blower for temperature cycle control of said heating element and blower.

20. Device according to claim 1, including a housing disposed below said roasting chamber, a heating region disposed in said housing, a heating element disposed in said heating region, a blower disposed in said housing, a power control timer switch and a temperature control switch disposed in said housing and electrically connected to said heating element and said blower for time and temperature cycle control of said heating element and blower.

21. Device for roasting coffee beans, comprising a roasting chamber having a given volume for receiving a quantity of coffee beans being small in proportion to the volume of said roasting chamber, means for directing a heatable air current through said roasting chamber substantially vertically from the bottom upward for rotating, upwardly whirling and circulating the coffee beans in a freely suspended state substantially untouched by each other and by said roasting chamber, said roasting chamber having a funnel-shaped air current inlet region with an air inlet formed thereon, a housing on which said roasting chamber is detachably mounted, an air heating region disposed in said housing, a blower disposed in said housing, a heating device disposed in said heating region, and a safety switch disposed in said housing and electrically connected to said blower and heating device for supplying voltage to said blower and heating device in dependence on the presence of said roasting chamber on said housing.

22. Device according to claim 21, wherein said blower is a stage blower.

* * * * *